March 4, 1924.

W. A. TURBAYNE

GENERATOR SYSTEM

Original Filed Aug. 11, 1919

WITNESS:
Stewart Holmes.
Ralph Munden

INVENTOR.
Wᵐ. A. Turbayne.
BY
Raymond H. VanVleet
ATTORNEY.

March 4, 1924.

W. A. TURBAYNE

GENERATOR SYSTEM 1,485,742

Original Filed Aug. 11, 1919 — 2 Sheets-Sheet 2

WITNESS:
Stewart Holmes.
Ralph Munden.

INVENTOR.
W<sup>m</sup>. A. Turbayne.
BY
Raymond H. Van Vleet
ATTORNEY.

Patented Mar. 4, 1924.

1,485,742

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

GENERATOR SYSTEM.

Application filed August 11, 1919, Serial No. 316,787. Renewed July 6, 1923.

*To all whom it may concern:*

Be it known that I, WILLIAM A. TURBAYNE, a citizen of the United States, residing at Niagara Falls, in the county of Niagara and State of New York, have invented new and useful Improvements in Generator Systems, of which the following is a specification.

The present invention relates to generator systems.

More particularly the present invention relates to systems involving generators which are subject to great fluctuations in current and voltage and in which it is desirable to maintain a stiff generator field under heavy loads.

An object of the prevent invention is to provide a novel system involving a generator which will maintain a stiff field even though a very heavy load is thrown on said generator.

A further object is to provide a system which is simple and sturdy in its construction and inherent in its action.

A further object is to provide a system involving a self-exciting generator which will maintain an effective voltage on its exciting circuit, even though the generator terminals be practically short-circuited.

Further objects will be apparent as the description proceeds.

The present invention has been illustrated herein in simple form for the purpose of simplifying the description. A bipolar field structure is disclosed. It will be evident, however, that the number of poles may be multiplied as desired, so long as the electrical and magnetic relations are maintained. According to the machine illustrated, a field structure sets up a main magnetic flux threading the armature. Means are also provided for setting up a flux varying in degree and direction under different conditions of operation to modify the main flux.

Figure 1:
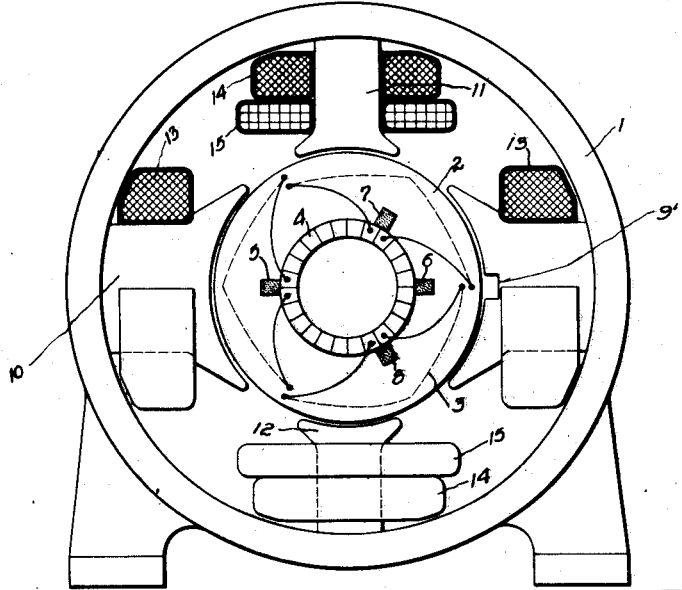
Fig. 1 represents a dynamo-electric machine employed in a system according to the present invention.
Figure 5:
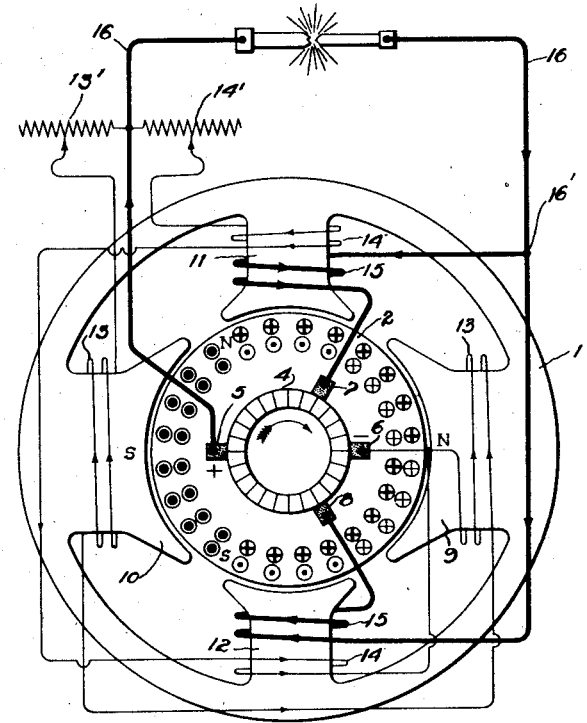
Fig. 5 represents a system embodying the present invention.

Referring first to Figs. 1 and 5, the field frame of the dynamo electric machine is indicated by the numeral 1. Said dynamo electric machine is provided with an armature 2 provided with conductors 3, arranged to form coils. The ends of each coil are connected by symmetrically arranged end connectors to adjacent bars of the commutator 4. Fig. 1 illustrates only three coils, but it will be understood, of course, that additional coils are distributed around the armature. Bearing on the commutator 4 are a pair of brushes 5 and 6. Said brushes 5 and 6 are arranged 180 electrical degrees apart with reference to the main field of flux which will be described hereinafter, and are connected to supply field excitation for the machine. Said brushes, with the symmetrically arranged end connectors for the armature conductors, will be located in line with the main field of flux and will connect with the armature at points of maximum potential difference due to rotation in said field. Arranged substantially 60 degrees on either side of brush 6 are brushes 7 and 8 which are connected together and through the outside or work circuit to brush 5.

The field frame 1 has a pair of main pole pieces 9 and 10 which are diametrically arranged on opposite sides of the armature 2. Spaced between said pole pieces 9 and 10 are the modifying pole pieces 11 and 12. Main pole pieces 9 and 10 are provided with field windings 13, 13, while each of the modifying pole pieces 11 and 12 is provided with a pair of windings 14 and 15. It will be noted that the main field windings 13, 13 are connected between brushes 5 and 6 through an adjustable resistance 13'. Field windings 14, 14 are also connected across brushes 5 and 6, said connection being made through adjustable resistance 14'.

The work circuit is indicated by the numeral 16 and is connected between the brush 5 on one side of the armature and the brushes 7 and 8 on the other side of the armature.

Starting with the brush 5, circuit may be traced through the work circuit 16 to the point 16', at which point the circuit divides, being traceable on the one hand through one of the coils 15 to the brush 7 and on the other hand, through the other coil 15 to the brush 8.

The coils of the armature have a pitch of 120 electrical degrees relative to the main pole pieces 9 and 10. In the bipolar structure illustrated, the winding pitch will be actually 120 degrees. In case the number of poles is multiplied, the actual pitch of the armature winding will be correspondingly reduced. It will be apparent from the description hereinafter that the distribution of flux is so modified by the modifying poles 11 and 12, that the bipolar structure illustrated will have a distribution of flux through part of said armature resembling the distribution in a four-pole structure. In a four-pole structure the distribution of flux in part of the field frame would resemble the flux distribution in an eight-pole structure. The same proportions will be carried out in constructions having other numbers of poles.

As will appear as the description proceeds, the modifying poles have common polarity, which polarity may be reversed under certain stages of operation. The 120 degree pitch of the armature winding has been chosen for the reason that such a winding is found to be equally effective in a bipolar or a four-pole field construction.

The pole 9 may be notched out as indicated at 9' in order to increase the reluctance over the armature core teeth embracing slots carrying conductors undergoing communication by brushes 7 and 8, thereby aiding the process of commutation by reducing the self-induction of these coils.

The coils 13, 13, upon the main pole pieces, are wound to produce opposite polarities in said pole pieces. As illustrated, pole piece 9 has a north polarity, while pole piece 10 has a south polarity. Said pole pieces 9 and 10 therefore, constitute a bipolar structure in the machine illustrated. Windings 14, 14 are adapted to modify the flux developed by windings 13, 13.

Figure 2:
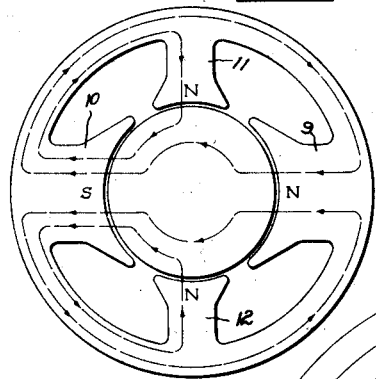
Figs. 2 and 3 illustrate the distribution of flux in said dynamo-electric machine.
Figure 3:
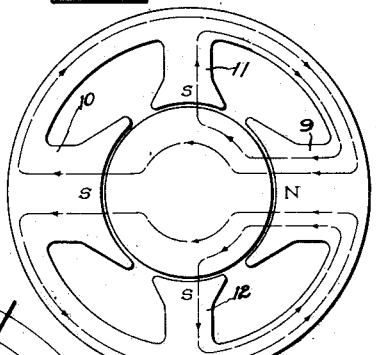

When the machine is running on open circuit; that is, when the work circuit 16 is disconnected, the modifying windings 14, 14 will modify the flux of the machine in the manner illustrated in Fig. 2, wherein flux from north main pole 9 and flux from modifying north poles 11, 11 unite and return through south main pole 10, resulting in the development of high voltage across brushes 5—8 and 5—7. The windings 15, 15 are so connected that when the work circuit 16 is connected, said windings 15, 15 will oppose windings 14, 14 and under certain conditions, will overcome said windings 14, 14 whereby to reverse the polarity of modifying pole pieces 11 and 12. The flux paths under this condition of reversal are illustrated in Fig. 3, wherein the modifying poles are both of south polarity.

Figure 4:
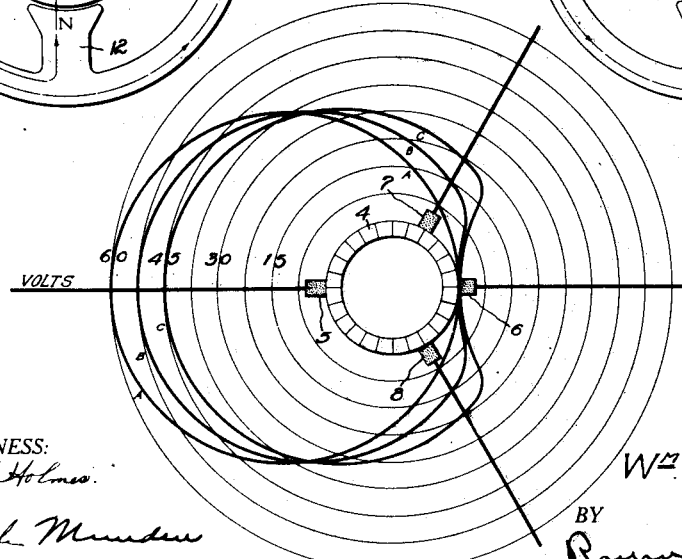
Fig. 4 is a polar diagram representing the distribution of voltage around the armature in said dynamo-electric machine.

The voltage conditions existing around the commutator on the machine illustrated are indicated by curves A, B, and C on the polar diagram, Figure 4. In order to simplify the description, certain specific figures have been chosen in connection with this polar diagram, said figures being taken from standard arc welding practice. In arc welding operations it is often desired to have an open circuit voltage of approximately 60 volts and this value is obtained by exciting poles 11 and 12 as north poles by means of windings 14, 14 which give the distribution of magnetic flux illustrated in Figure 2. The welding arc requires a voltage in the neighborhood of from 20 to 25 volts. According to the system disclosed herein the voltage is automatically reduced to the desired value by inherent action of the current passing around coils 15, 15 which, as explained above, are wound in a direction to make poles 11 and 12 south poles, bringing about a distribution of flux as illustrated in Fig. 3.

According to the polar diagram illustrated in Fig. 4, when the machine is running on open circuit, the voltage effective across brushes 5 and 6, which supply the field excitation for main pole pieces 9 and 10 and also modifying pole pieces 11 and 12, is 60 volts. When current is supplied to the work circuit 16, this current in traversing coils 15, 15 will change the flux distribution in poles 11 and 12, reducing or reversing said flux. This action, by decreasing the value of the flux effective on armature conductors between brushes 7—5 and 8—5 and correspondingly increasing the flux effective on the armature conductors embraced between brushes 6—7 and 6—8, will bring about a condition illustrated by the curve B. From this curve it will be noted that the voltage between brushes 5—7 and 5—8 has dropped to the difference between 52.5 and 15 or 37.5 volts, while the voltage across brushes 5 and 6 which supply the field excitation has dropped to only 52.5 volts. Curve C indicates conditions wherein a still heavier current is flowing in work circuit 16, at which time the voltage on the work circuit has decreased to the difference between 45 volts and 22.5 volts, or 22.5 volts. At the same time, the voltage effective across the field brushes 5 and 6 has dropped to only 45 volts. Some exaggerated conditions might be illustrated in which the work circuit is closed through practically no resistance. Even under these conditions a relatively high voltage is impressed across field brushes 5 and 6 whereby a stiff field is maintained.

When the generator becomes loaded, the current in the armature conductors sets up an armature cross flux, tending to make pole 11 a south pole, which action set up a difference of potential between brushes 7 and 8, brush 7 being positive to brush 8. Under these conditions the current in the work circuit 16 returns to the armature in greater part through brush 8, through its corresponding coil 15. The magnetizing action of this latter coil is in the proper direction to compensate for the armature cross flux. By suitably proportioning the number of turns in the two coils 15, the compensating effect may be varied as desired.

The above illustration has been chosen from arc welding practice. The present invention is not limited, however, to arc welding practice but has a much broader application, as for instance, in the art of arc lighting and other arts wherein heavy fluctuations of current and voltage must not be allowed to interfere with the excitation of the generator.

Figure 6:
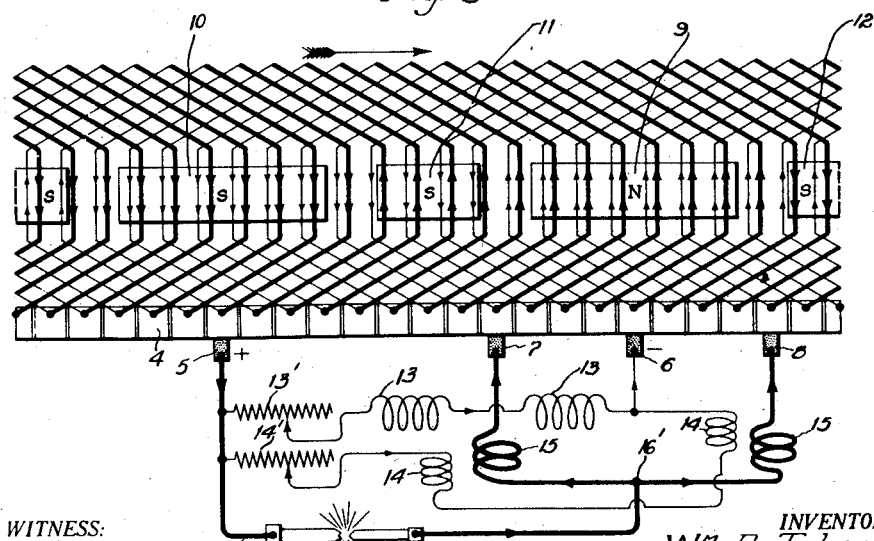
Fig. 6 represents a development of the armature, together with outside connections illustrating the distribution of current in a system according to the present invention.

The distribution of current in the armature conductors is illustrated in Fig. 6 in which the presence and direction of current in the armature conductors is illustrated by the arrows.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States, is—

1. In combination, a generator having a field frame and an armature, said field frame having main field poles spaced 180 electrical degrees apart, modifying poles spaced midway of said main poles, said modifying poles being wound to have common polarity, brushes placed at points of maximum potential difference due to rotation in the field produced by said main field poles, field windings on said main field poles connected across said brushes, other brushes spaced 120 electrical degrees apart and symmetrically with one of said first mentioned brushes, and a work circuit connected between said other brushes on one side and one of said first mentioned brushes on the other side.

2. In combination, a generator having a field frame and an armature, said field frame having main field poles spaced 180 electrical degrees apart, modifying poles spaced midway of said main poles, said modifying poles being wound to have common polarity, brushes placed at points of maximum potential difference due to rotation in the field produced by said main field poles, field windings on said main field poles connected across said brushes, other brushes spaced 120 electrical degrees apart and symmetrically with one of said first mentioned brushes, and a work circuit connected between said other brushes on one side and one of said first mentioned brushes on the other side, said armature having a winding pitch of substantially 120 electrical degrees relative to said main field poles.

3. In combination, a generator having main poles for setting up a main field flux, other poles of common polarity for setting up modifying flux in quadrature to said first mentioned flux, brushes placed at points of maximum potential difference due to rotation in said main field, said brushes being connected to provide the excitation for said main poles, other brushes spaced 120 electrical degrees apart and symmetrically with one of said first mentioned brushes, a work circuit connected between said other brushes on one side and one of said first mentioned brushes on the other side, means connected to said first mentioned brushes for exciting said modifying poles, and means responsive to the current in said work circuit for opposing said first mentioned means.

4. In combination, a generator and a work circuit, said generator having main poles for setting up a main field flux, other poles for setting up a modifying flux in quadrature to said first mentioned flux, field windings for exciting said main poles, field windings whose excitation is proportional to the excitation of said first mentioned windings for exciting said other poles, and means responsive to the current in said work circuit for opposing the effect of said second mentioned field windings.

5. In combination, a generator and a work circuit, windings for setting up main field flux, modifying windings for setting up a modifying flux in quadrature to said first mentioned flux, a pair of brushes for supplying said windings, a pair of other work brushes spaced from said first mentioned brushes, said work circuit including windings opposing said modifying windings and connected in series with said other brushes.

6. In combination, a generator and a work circuit, said generator including means for setting up main field flux, means for setting up opposed modifying fluxes in quadrature to said main flux, brushes of opposite polarity connected to supply both said means, a pair of other brushes of like polarity connected through said work circuit to one of said first mentioned brushes, and electromagnetic means responsive to the current flow in said work circuit for controlling said modifying fluxes.

7. In combination, a generator and a work circuit, said generator having an armature and poles of opposite polarity for setting up main flux, poles of common polarity placed intermediate of said first mentioned poles, and means responsive to said work circuit for reversing said common polarity, said first mentioned poles having windings connected to said armature at points whose potential difference changes only a relatively small amount due to the normal action of said poles of common polarity.

8. In combination, a generator and a work circuit, said generator having an armature, poles of opposite polarity for setting up main flux, modifying poles placed intermediate of said first mentioned poles, means for exciting said modifying poles to produce a common polarity therein and means responsive to the current in said work circuit for reversing said common polarity, the exciting means for said modifying poles being connected to said armature at points at which the potential difference changes only a relatively small amount under the influence of said modifying poles.

9. In combination, a generator having a field frame and an armature, said field frame having main field poles spaced 180 electrical degrees apart, modifying poles spaced midway of said main poles, said modifying poles being wound to have common polarity, brushes placed at points of maximum potential difference due to rotation in the field produced by said main field poles, field windings on said main field poles connected across said brushes, other brushes spaced 120 electrical degrees apart and symmetrically with one of said first mentioned brushes, and a work circuit connected between said other brushes on one side and one of said first mentioned brushes on the other side, said modifying poles having windings connected to carry a current proportional to that carried by said work circuit.

10. In combination, a generator having a field frame and an armature, said field frame having main field poles spaced 180 electrical degrees apart, modifying poles spaced midway of said main poles, said modifying poles being wound to have common polarity, brushes placed at points of maximum potential difference due to rotation in the field produced by said main field poles, field windings on said main field poles connected across said brushes, other brushes spaced 120 electrical degrees apart and symmertically with one of said first mentioned brushes, and a work circuit connected between said other brushes on one side and one of said first mentioned brushes on the other side, said armature having a winding pitch of substantially 120 electrical degrees relative to said main field poles, said modifying poles having windings connected to carry a current proportional to that carried by said work circuit.

11. A self-exciting dynamo-electric machine having main field flux producing means, means for supplying a load circuit, and flux modifying and distributing means co-operating with said flux producing means for maintaining a relatively strong magnetic field under conditions of said load circuit varying from open circuit to short circuit.

12. A self-exciting dynamo-electric machine having main field poles, flux producing windings thereon connected across brushes arranged at points of maximum potential difference to create a relatively strong main field, a load circuit subject to wide fluctuations, and field flux modifying means responding to a function of said load circuit for causing a distribution of main field flux to maintain a relatively strong flux despite wide fluctuations in said load circuit.

13. A self-exciting dynamo electric machine provided with main poles and means for holding up the field excitation despite load changes, said means comprising means responding to load circuit variations for redistributing the field flux to permit wide variations in flux in portions of the magnetic circuit while preventing any but substantially lesser changes in said main poles.

14. A self excited dynamo-electric machine provided with a plurality of brushes, a plurality of main poles and auxiliary poles, main flux producing windings connected across certain of said brushes to produce a relatively strong field, a widely fluctuating load connected across certain of said brushes, and windings co-operating with said main and auxiliary poles and influenced by variations in said load circuit to vary the distribution of field flux to maintain a relatively high field flux despite variations in said load and to cause load fluctuations to affect said main flux in relatively slight degree.

In witness whereof, I have hereunto subscribed my name.

WILLIAM A. TURBAYNE.